(12) United States Patent
Miller

(10) Patent No.: US 7,471,319 B2
(45) Date of Patent: Dec. 30, 2008

(54) LENS AND CCD CORRECTION USING SINGULAR VALUE DECOMPOSITION

(75) Inventor: Casey L. Miller, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 11/262,223

(22) Filed: Oct. 28, 2005

(65) Prior Publication Data

US 2007/0097235 A1     May 3, 2007

(51) Int. Cl.
*H04N 5/217*  (2006.01)
*H04N 9/64*   (2006.01)
*H04N 5/235*  (2006.01)
*H04N 9/097*  (2006.01)

(52) U.S. Cl. .................... 348/241; 348/251; 348/229.1; 348/259

(58) Field of Classification Search ................. 348/241, 348/229.1, 259, 251, 615, 661, 841; 382/274, 382/275, 283, 141
See application file for complete search history.

(56) References Cited

U.S. PATENT DOCUMENTS

| 4,569,033 | A | * | 2/1986 | Collins et al. | 708/839 |
| 5,047,861 | A | * | 9/1991 | Houchin et al. | 348/247 |
| 5,710,602 | A | * | 1/1998 | Gardos et al. | 348/586 |
| 6,108,453 | A | * | 8/2000 | Acharya | 382/254 |
| 6,115,104 | A | * | 9/2000 | Nakatsuka | 355/40 |
| 6,628,329 | B1 | * | 9/2003 | Kelly et al. | 348/252 |
| 6,667,708 | B2 | * | 12/2003 | Schooler et al. | 341/173 |
| 7,227,551 | B2 | * | 6/2007 | Zimmer et al. | 345/586 |
| 2004/0095374 | A1 | * | 5/2004 | Jojic et al. | 345/716 |
| 2008/0159650 | A1 | * | 7/2008 | Odamaki | 382/283 |

* cited by examiner

*Primary Examiner*—Lin Ye
*Assistant Examiner*—Marly Camargo

(57) ABSTRACT

Imaging devices, such as digital cameras, scanners, displays and projectors, and related processing methods that implement calibration and post-capture image processing that quickly and accurately corrects image quality resulting from lens and CCD imperfections using a minimum amount of computation and memory storage space.

8 Claims, 4 Drawing Sheets

Uncorrected Image

Polynomial $n = 3$ (6 kB, 102 kOps)

Polynomial $n = 7$ (32 kB, 273 kOps)

SVD $n = 3, w = 6$ (34 kB, 109 kOps)

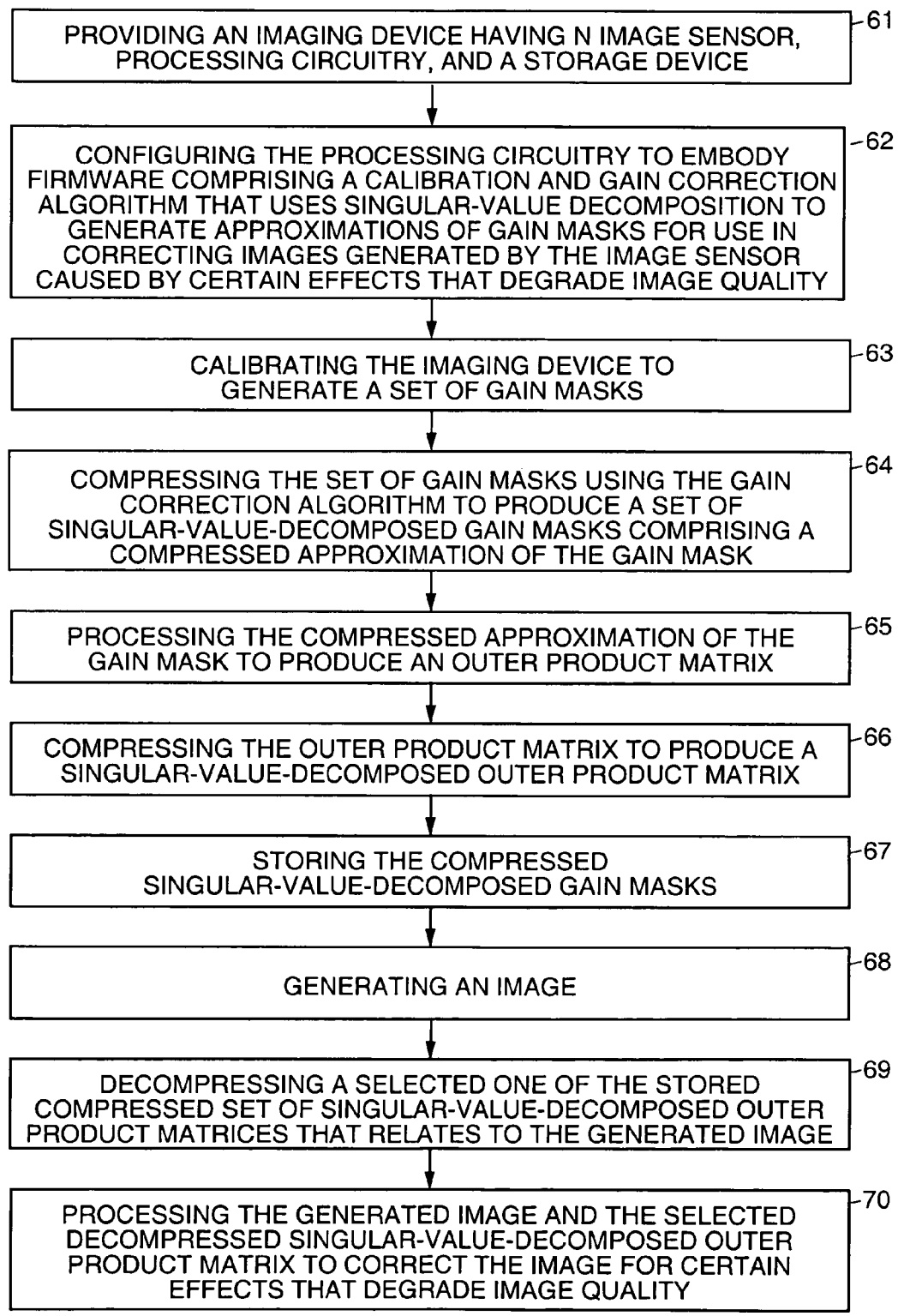

LENS AND CCD CORRECTION USING SINGULAR VALUE DECOMPOSITION

BACKGROUND

All digital cameras suffer from lens and CCD effects that degrade image quality. For example, lens vignetting (the property of all lenses to gather more light in the center of the image) causes darkening of the corners of the image when compared with the image center. Another degradation is color shading, which is a gradual shift in color from one edge of the image to another. Color shading is easiest to see when the scene to be captured is a solid color (e.g. a clear blue sky or a blank wall). Color shading is the result of an interaction between the lens and CCD and is present in all digital cameras to varying degrees. A third type of degradation are lens blemishes which are caused by irregular lens surfaces. These irregularities are most visible when the lens is at full telephoto and smallest aperture (similar to the effect of dust on the lens).

Good quality digital cameras utilize a calibration and post-capture image processing algorithm to reduce or remove unwanted lens and CCD effects. A camera is calibrated by capturing an image of a uniformly illuminated, uniform-color scene (e.g. a white wall). Since the scene is known to be of uniform brightness and color, gains can be determined for each pixel location (r,c) to ensure the final image has uniform brightness and color. These gains may be represented by a matrix G with R rows and C columns. Because lens and CCD distortion changes with zoom and aperture position, a gain image $G_{az}$ needs to be stored for each aperture $a \in \{1 \ldots A\}$ and zoom position $z \in \{1 \ldots Z\}$. Unfortunately, there can be 100 or more such gain images for all zoom and aperture settings. The key is to utilize a method that can be computed quickly with minimum on-camera memory use while still accurately correcting lens and CCD effects.

The most common solution to lens and CCD distortion correction is polynomial-fitting. In polynomial fitting, the vectors $x=[1, 2, \ldots C]T$ and $y=[1, 2, \ldots R]T$ are defined so that the following Vandermonde matrices can be defined $$X=[x^0, x^1, \ldots, x^{n-1}] \quad (1)$$

$$Y=[y^0, y^1, \ldots, y^{n-1}]. \quad (2)$$

The polynomial approximation may then be written as:

$$G_{az} \approx Y C_{az} X^T \quad (3)$$

where the n×n matrix $C_{az}$ of polynomial coefficients are given by $$C_{az}=(Y^T Y)^{-1} Y^T G_{az} X (X^T X)^{-1} \quad (4)$$

Assuming $n^2$ coefficients per gain mask, 2 bytes per coefficient and 3 color planes, it would take a total of $6AZn^2$ bytes to store all the polynomial coefficients. Assuming that the matrices X and Y can be precomputed, Equation 3 takes Cn(n+R) multiplies and C(n+R)(n−1) adds for a total of C(R+n)(2n−1) operations.

Polynomial fitting thus involves fitting a two-dimensional polynomial to the gain image and then storing the coefficients of the polynomial. Since there are usually 10 or so polynomial coefficients, only 10 numbers need to be stored for each zoom and aperture position. Additionally, since polynomials are generated using only multiplications and additions, gain masks can be efficiently computed and applied once the user captures an image.

Unfortunately, polynomials with an efficiently computable number of coefficients form a poor approximation to ideal gain masks. In short, polynomial fitting is a computationally efficient method of lens/CCD correction that involves a small amount of memory storage, but the overall correction ability is limited.

It would be desirable to have a gain correction method that may be implemented in a calibration and post-capture image processing algorithm that achieves a superior level of correction with minimal memory use.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 3 is a flow diagram that illustrates an exemplary gain correction method for use with a digital camera.

DETAILED DESCRIPTION

The single value decomposition procedures discussed below relate to calibration and correction of images, and are generally described with regard to their use with a digital camera. However, it is to be understood that the method of calibration and correction described herein is also well-suited for use in scanners, displays and projectors, and the like, and is not limited to use in digital cameras.

Figure 1A:
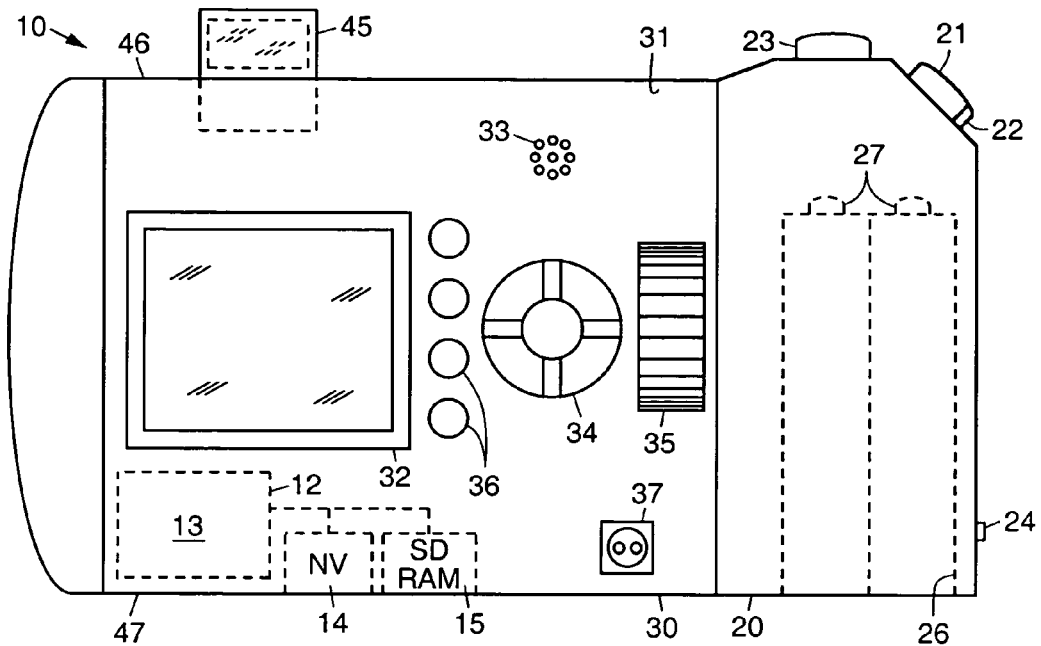
FIGS. 1a and 1b are rear and front views, respectively, of an exemplary digital camera employing singular-value-decomposed gain correction.
Figure 1B:
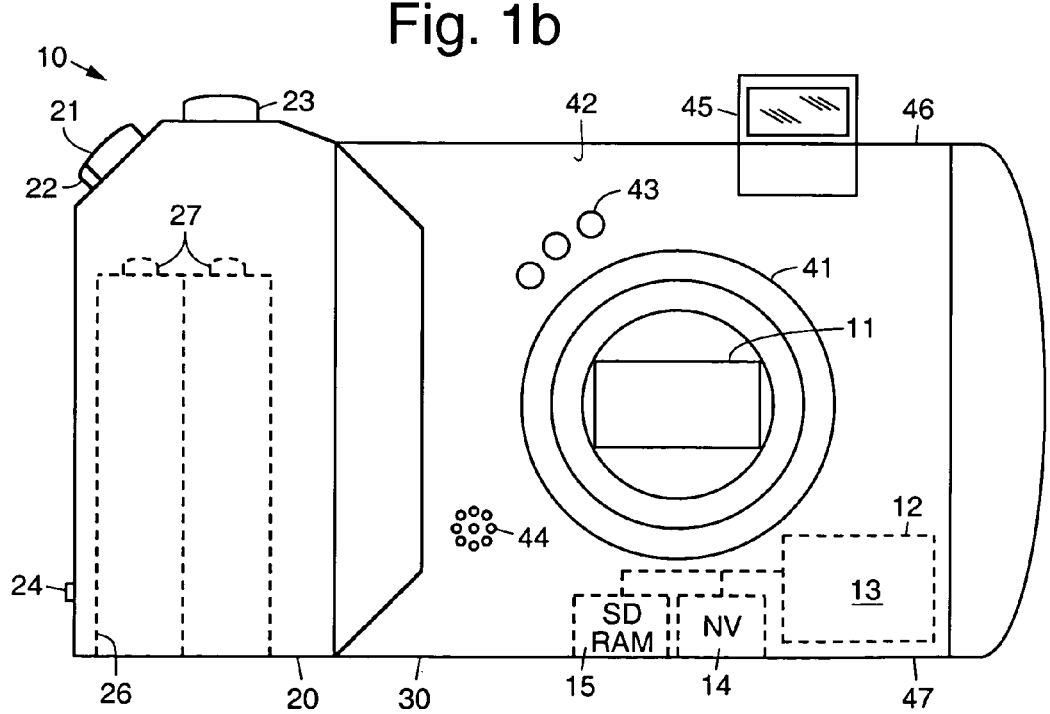

Referring to the drawing figures, FIGS. 1a and 1b are rear and front views, respectively, of an exemplary digital camera 10 that may employ gain correction methods that may be implemented in a calibration and post-capture image processing algorithm as disclosed herein. As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a liquid crystal display (LCD) 32 or viewfinder 32, a rear microphone 33, a joystick pad 34, a zoom control dial 35, a plurality of buttons 36 for setting functions of the camera 10 and a video output port 37 for downloading images to a computer, for example. As is shown in FIG. 1b, a zoom lens 41 extends from a front surface 42 of the digital camera 10. A metering element 43 and front microphone 44 are disposed on the front surface 42 of the digital camera 10. A pop-up flash unit 45 is disposed adjacent a top surface 46 of the digital camera 10.

An image sensor 11, such as a charge coupled device (CCD) array, for example, is coupled to processing circuitry 12 (illustrated using dashed lines), both of which may be housed within the body section 30, for example. An exemplary embodiment of the processing circuitry 12 comprises a microcontroller (μC) 12 or central processing unit (CPU) 12. The microcontroller 12 or CPU 12 is coupled to a nonvolatile (NV) storage device 14, and a high speed (volatile) storage device 15, such as synchronous dynamic random access memory (SDRAM) 15, for example.

The processing circuitry 12 (microcontroller 12 or CPU 12) in the digital camera 10, embodies firmware 13 comprising a calibration and gain correction algorithm 13 that implements a method 60 using singular-value decomposition. This will be discussed in more detail below and with reference to FIG. 2.

The digital camera 10 is calibrated to generate a set of gain masks. These gain masks are compressed for on-camera storage with minimal loss of information into a form that is computationally efficient to decompress. In a first stage, the gain masks are individually compressed. Then, in a second stage, similarities between the compressed gain masks are exploited to further compress the data.

The gain masks are individually compressed by computing a compressed approximation of a single gain mask via singular-value decomposition (SVD) into $$G = USV^T \quad (5)$$

where $U^T U = V^T V = I$, I is an identity matrix and $V^T$ represents the transpose of matrix V. The matrix S is diagonal with non-negative diagonal elements in decreasing order.

The diagonal elements of S are called the singular values of G. Because the elements of G change slowly with changing row or column (in other words, G is smooth), the singular values of G will decrease quickly. This means that all but the largest n singular values can be set to zero to obtain a good approximation of G.

Let the notation A(i:j, u: v) represent a sub-matrix of matrix A given by rows i thru j and columns u thru v. Define $$\overline{U} = U(1: R, 1:n) \sqrt{S(1:n,1:n)} \quad (6)$$

$$\overline{V} = V(1: C, 1:n) \sqrt{S(1:n,1:n)} \quad (7)$$

so that the approximation can be written as $G \approx \overline{U}\overline{V}^T$.

An algorithm that can find U(1: R,1: n), V(1: C, 1: n) and S(1: n, 1: n) follows, This algorithm may be referred to as a subspace algorithm for partial single value decomposition.

The subspace algorithm is a method for finding the n largest singular values (eigenvalues) and singular vectors (eigenvectors) of a given R×R hermitian matrix A (a real-valued matrix A is hermitian if $A^T = A$). The subspace algorithm iterates until the error is less than some tolerance $\epsilon$ as follows Step 1: Pick an initial guess for U (e.g. U=A(1: R,1: n)).

Step 2: QR decompose U→QR and then set U=Q, such as by using a decomposition algorithm discussed in Press, H. et al, *Numerical Recipes in C*, Cambridge University Press, N.Y. 1992.

Step 3: Compute Y=AU and S=$U^T$Y

Step 4: If ||Y_US||>_then set U=Y and loop to Step 2.

Care must be taken not to choose n larger than the rank of A or the subspace method will not converge. The subspace method may be used to find the partial single value decomposition of a non-hermitian matrix A with R rows and C columns. Observe that $$AA^T = USV^T(USV^T)^T = USV^T VSU^T = US^2U^T,$$

so the subspace algorithm can be used on $AA^T$ to get U and $S^2$. Matrix V can be solved for using $A^T = VSU^T$, $A^T U = VS$, and $A^T US^{-1} = V$. If R>C then it is faster to use $A^T A$ to get V and $S^2$ and compute $U = AVS^{-1}$.

In the second stage, similarities between approximated gain masks are exploited in order to further reduce memory storage requirements. Let $\overline{U}_{az}$ represent the matrix for a given aperture a and zoom position z. The following outer-product matrix is generated for each column of $\overline{U}_{az}$ $$P_c = \sum_{a,z} \overline{U}_{az}(1:R, c)\overline{U}_{az}(1:R, c)^T \quad (8)$$

Singular-value decompose each outer product matrix $$P_c U_c S_c U_c^T. \quad (9)$$

Define the matrix $\hat{U}_c = U_c(1: R, 1: w)$ in order to form the approximation $\overline{U}_{az}(1: R,c) \approx \hat{U}_c^T u_{azc}$ where $u_{azc}$ is a w×1 vector given by $$u_{azc} = \hat{U}_c^T \overline{U}_{az}(1:R,c). \quad (10)$$

Equations. 8, 9 and 10 are repeated to find the basis $\hat{V}_c$ and weights $v_{azc}$ for each column of $\overline{V}_{az}$. Table 1 summarizes the memory requirements for this method and Table 2 summarizes the computational requirements.

TABLE 1

| Matrix | Size | Bytes | Qty | Total Bytes |
|---|---|---|---|---|
| $U_c$ | R × w | 2Rw | n | 2Rwn |
| $V_c$ | C × w | 2Cw | n | 2Cwn |
| $u_{azc}$ | w × 1 | 2w | 3AZn | 6wAZn |
| $V_{azc}$ | w × 1 | 2w | 3AZn | 6wAZn |
| | | | | 2wn(R + C + 6AZ) |

TABLE 2

| Matrix | Multiplies | Adds | Qty | Total Operations |
|---|---|---|---|---|
| $\overline{U}_{az}(:, c) = U_c u_{azc}$ | Rw | R(w − 1) | n | Rn(2w − 1) |
| $\overline{V}_{az}(:, c) = V_c v_{azc}$ | Cw | C(w − 1) | n | Cn(2w − 1) |
| $G_{az} = \overline{U}_{az} \overline{V}_{az}^T$ | RCn | RC(n − 1) | 1 | RC(2n − 1) + n(R + C)(2w − 1) |

Figure 2A:
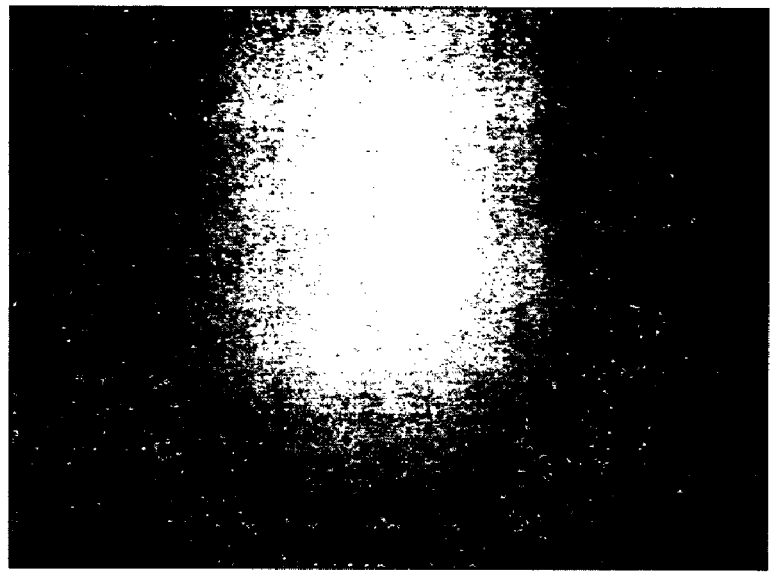
FIGS. 2a-2d illustrate comparison between polynomial computation and single value decomposition procedures.
Figure 2B:
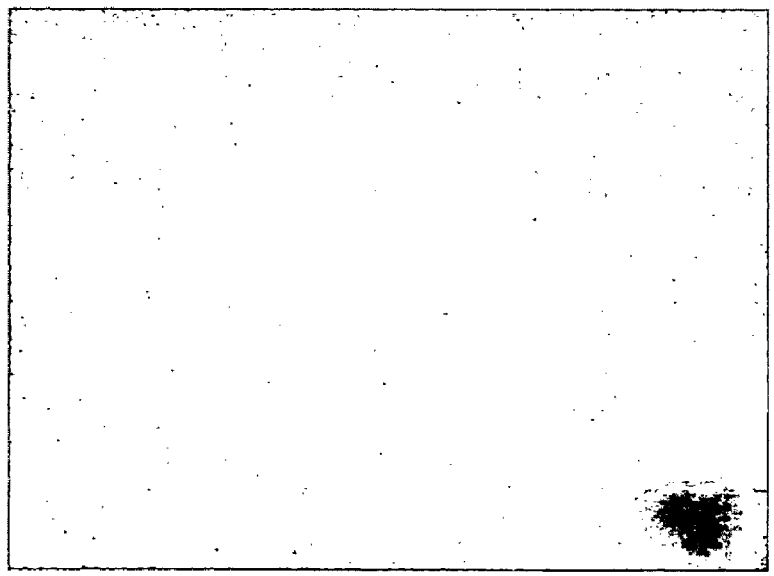

FIGS. 2*a*-2*d* illustrate comparison between polynomial computation and single value decomposition procedures for R=122, C=163, A=10, and Z=11. FIG. 2*a* shows an uncorrected image of a uniformly illuminated, uniform color scene. Notice the non-uniform color from top to bottom and lens blemish in the lower right corner. FIG. 2*b* shows the image when corrected using the polynomial method with order n=3 which uses less memory but roughly the same number of operations as the single value decomposition method. Although vignetting has been reduced, the lens blemish is still clearly visible.

Figure 2C:
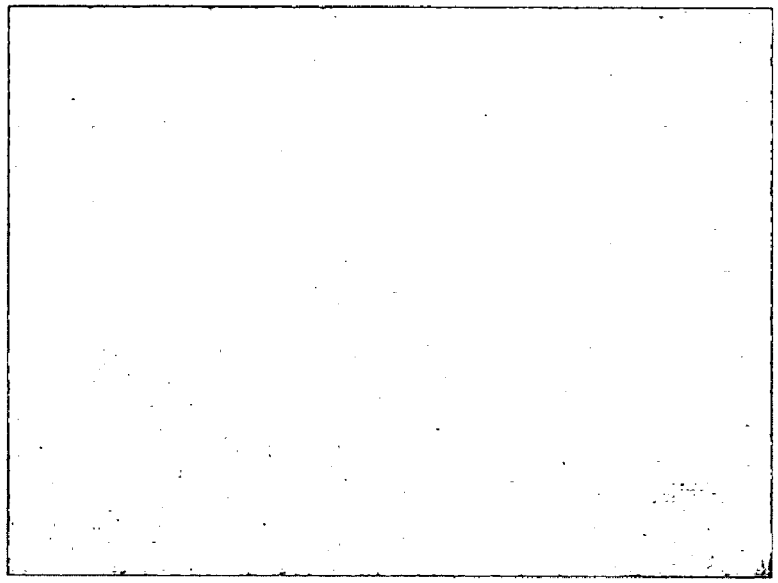
Figure 2D:
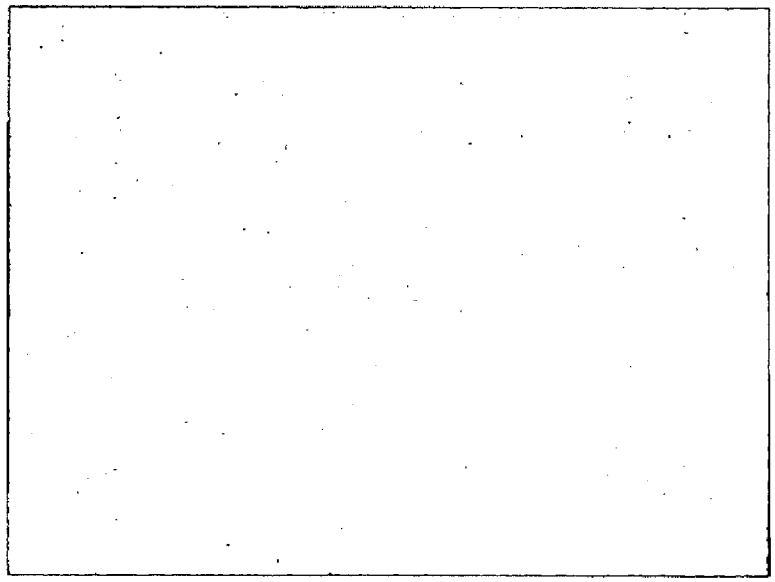

FIG. 2*c* shows the image when corrected using the polynomial method with order n=7 which uses roughly the same amount of memory, but nearly three times the computation of the single value decomposition method. Although the lens blemish has been reduced, it is still clearly visible. FIG. 2*d* shows the image when corrected using the single value decomposition method. The lens blemish in the lower right corner has been greatly reduced. Clearly, the single value decomposition method offers an improved trade-off between memory use, computational complexity and image correction ability.

Conventional polynomial fitting leads to a coarse approximation of the ideal gain mask when using the typical number of polynomial coefficients that lead to computational efficiency. In contrast, singular-value decomposition of the ideal gain mask leads to an excellent approximation versus the amount of computation required to regenerate the gain mask.

Given the above, and referring to FIG. 3, it is a flow diagram that illustrates an exemplary gain correction method 60 such as may be used with a digital camera 10, for example.

The exemplary gain correction method 60 may be implemented as follows.

An imaging device 10, such as a digital camera 10, is provided 61 that comprises an image sensor 11, processing circuitry 12 and a storage device 14. The processing circuitry 12 is configured 62 to embody firmware 13 comprising a calibration and gain correction algorithm 13 that uses singular-value decomposition to generate approximations of gain masks for use in correcting images generated by the image sensor 11 caused by certain effects that degrade image quality.

The imaging device 10, or digital camera 10, is calibrated 63 to generate a set of gain masks. The set of gain masks is compressed in two stages. Each individual gain mask is compressed 64 using single value decomposition to produce a singular-value-decomposed gain mask that comprises a compressed approximation of the gain mask. Each compressed approximated gain mask is then processed 65 to produce an outer product matrix. Each outer product matrix is then compressed 66 using single value decomposition to produce a singular-value-decomposed outer product matrix. The compressed set of singular-value-decomposed outer product matrices is stored 67 in the imaging device 10, or digital camera 10. During operation, an image is generated 68 by the image sensor 11. A selected one of the stored compressed set of singular-value-decomposed outer product matrices that relates to the generated image is decompressed 69. The generated image and the selected decompressed singular-value-decomposed outer product matrix are processed 70 to correct the image for effects that degrade image quality.

The above-described single value decomposition method of lens and CCD correction provides improved correction ability and less computational complexity compared with conventional polynomial correction. A strength of the single value decomposition method comes from use of custom separable functions that best approximate a given gain mask. These separable functions require extra memory storage but provide an improved trade-off between accuracy of the gain mask approximation and overall computation. The single value decomposition method can be used whenever a group of similar images need to be stored in compressed format. The single value decomposition method may be considered as a form of 3D compression that is particularly suited to relatively smooth images. As a result, the above-described method of calibration and correction is well-suited for use in scanners, displays and projectors.

Thus, digital cameras and algorithms that provide for lens and CCD correction using singular value decomposition have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. Apparatus comprising:
    a digital imaging device that comprises an image sensor, processing circuitry, and a storage device; and
    firmware stored in the digital imaging device that runs on the processing circuitry and that comprises a calibration and gain correction algorithm that uses singular-value decomposition to generate compressed approximated gain masks that are stored in the storage device and that are used to process images generated by the image sensor to correct them for certain effects that degrade image quality, wherein
    the firmware calibrates the imaging device to generate the gain masks, and wherein
    wherein the firmware processes the compressed approximated gain mask to produce an outer product matrix, and each outer product matrix is compressed using single value decomposition to produce a singular-value-decomposed outer product matrix.

2. The apparatus recited in claim 1 wherein the firmware stores the singular-value-decomposed outer product matrix in the storage device.

3. The apparatus recited in claim 2 wherein the firmware decompresses a selected one of the stored compressed singular-value-decomposed outer product matrices that relates to a generated image, and processes the generated image and the selected decompressed singular-value-decomposed gain outer product matrix to correct the image for the effects that degrade image quality.

4. Apparatus comprising:
    digital imaging means that comprises image sensor means, processing means, and storage means; and
    firmware stored in the digital imaging means that runs on the processing means and that comprises a calibration and gain correction algorithm that uses singular-value decomposition to generate compressed approximations of gain masks that are stored in the storage means and that are used to process images generated by the image sensor means to correct them for certain effects that degrade image quality, wherein
    the firmware calibrates the digital imaging means to generate the gain masks, and wherein
    the firmware processes the compressed approximated gain mask to produce an outer product matrix, and each outer product matrix is compressed using single value decomposition to produce a singular-value-decomposed outer product matrix.

5. The apparatus recited in claim 4 wherein the firmware stores the singular-value-decomposed outer product matrix in the storage device.

6. The apparatus recited in claim 5 wherein the firmware decompresses a selected one of the stored compressed singular-value-decomposed outer product matrices that relates to a generated image, and processes the generated image and the selected decompressed singular-value-decomposed outer product matrix to correct the image for the effects that degrade image quality.

7. A method comprising:
    providing a digital imaging device having an image sensor, processing circuitry, and a storage device;
    configuring the processing circuitry to embody firmware comprising a calibration and gain correction algorithm that uses singular-value decomposition to generate approximations of gain masks for use in correcting images generated by the image sensor caused by certain effects that degrade image quality;
    calibrating the digital imaging device to generate a set of gain masks;
    compressing the set of gain masks using the gain correction algorithm to produce a set of compressed singular-value-decomposed gain masks;
    processing the compressed gain masks to produce an outer product matrix;
    compressing the outer product matrix using single value decomposition to produce a singular-value-decomposed outer product matrix; and
    storing the compressed singular-value-decomposed outer product matrix in the storage device.

8. The method recited in claim 7 further comprising:

generating an image;

decompressing a selected one of the stored compressed set of singular-value-decomposed outer product matrices that relates to the generated image; and processing the generated image and the selected decompressed singular-value-decomposed outer product matrix to correct the image for certain effects that degrade image quality.

* * * * *

UNITED STATES PATENT AND TRADEMARK OFFICE
CERTIFICATE OF CORRECTION

PATENT NO.         : 7,471,319 B2
APPLICATION NO.    : 11/262223
DATED              : December 30, 2008
INVENTOR(S)        : Casey L. Miller It is certified that error appears in the above-identified patent and that said Letters Patent is hereby corrected as shown below:

In column 4, line 7, delete "$P_c U_c S_c U_c^T$" and insert -- $P_c = U_c S_c U_c^T$ --, therefor.

In column 4, line 10, delete "$\tilde{U}_c^T u_{azc}$" and insert -- $\hat{U}_c u_{azc}$ --, therefor.

In column 6, line 2, in Claim 1, after "and" delete "wherein".

Signed and Sealed this

Ninth Day of June, 2009

JOHN DOLL
*Acting Director of the United States Patent and Trademark Office*